United States Patent [19]

Chabanne

[11] Patent Number: 5,743,596
[45] Date of Patent: Apr. 28, 1998

[54] SAFETY FIXTURE FOR REMOVABLE SEAT OF THE VEHICLE

[75] Inventor: Jean-Pierre Chabanne, Champvallon, France

[73] Assignee: Irausa Ingeniera S.A., Burgos, Spain

[21] Appl. No.: 668,740

[22] Filed: Jun. 24, 1996

[30] Foreign Application Priority Data

Jun. 22, 1995 [FR] France .................... 95 07804

[51] Int. Cl.$^6$ ........................................ B60N 2/44
[52] U.S. Cl. .................... 297/463.1; 297/336; 297/335; 297/65.1
[58] Field of Search ................................ 297/335, 336, 297/463.1; 296/65.1

[56] References Cited

U.S. PATENT DOCUMENTS

| | | | |
|---|---|---|---|
| 4,606,577 | 8/1986 | Hirama et al. | 297/336 X |
| 4,759,580 | 7/1988 | Berklich, Jr. et al. | 297/336 X |
| 4,773,693 | 9/1988 | Premji et al. | 296/65.1 |
| 4,865,377 | 9/1989 | Musser et al. | 296/65.1 |
| 4,869,541 | 9/1989 | Wainwright | 296/65.1 |
| 4,978,158 | 12/1990 | Kubo et al. | 296/65.1 |
| 5,022,698 | 6/1991 | Butt et al. | 296/65.1 |
| 5,224,750 | 7/1993 | Clark et al. | 297/335 X |
| 5,238,285 | 8/1993 | Holdampf et al. | 297/336 X |
| 5,383,699 | 1/1995 | Woziekonski et al. | 296/65.1 |
| 5,443,239 | 8/1995 | Laporte | 296/65.1 X |
| 5,482,345 | 1/1996 | Bolsworth et al. | 297/336 X |
| 5,496,088 | 3/1996 | Stewart | 297/336 X |
| 5,498,051 | 3/1996 | Sponsler | 297/336 X |
| 5,547,242 | 8/1996 | Dukatz et al. | 297/463.1 X |
| 5,562,322 | 10/1996 | Christoffel | 297/336 X |
| 5,577,805 | 11/1996 | Glinter et al. | 297/335 X |
| 5,626,391 | 5/1997 | Miller et al. | 296/65.1 X |
| 5,634,686 | 6/1997 | Okazaki | 296/65.1 X |

FOREIGN PATENT DOCUMENTS

| | | | |
|---|---|---|---|
| 0397333 | 11/1990 | European Pat. Off. | |
| 0537078 | 4/1993 | European Pat. Off. | |
| 0545743 | 6/1993 | European Pat. Off. | |
| 0602696 | 6/1994 | European Pat. Off. | |
| 0609130 | 8/1994 | European Pat. Off. | |
| 0618102 | 10/1994 | European Pat. Off. | |
| 2556946 | 6/1985 | France | |
| 2251183 | 7/1992 | United Kingdom | 297/336 |

*Primary Examiner*—Laurie K. Cranmer
*Assistant Examiner*—Rodney B. White
*Attorney, Agent, or Firm*—Oliff & Berridge, PLC.

[57] ABSTRACT

A safety fixture for a removable vehicle seat of the type having four legs, two front legs and two rear legs. Each leg is equipped with a mobile catch for being affixed to at least one of two transverse rods fixed in the front or rear floor well of a vehicle. Each front leg has a hook-shaped part that interacts with one of the two parallel transverse rods fixed in the front floor well. The catch for the font legs can be returned and unlocked. First and second hook-shaped parts are used simultaneously affix each rear leg to both transverse rods in the rear floor well of the vehicle. The first and second hook-shaped parts are formed on a front and rear catch, respectively. The front catch articulates at the front and toward the base of a common support. The front catch also includes a triangular heel delimited by an upper face stop for immobilizing the rear catch in the locked position and a rear face stop for immobilizing the front catch in the open position. The rear catch articulates proximate to the top and middle of the common support and includes a triangular protuberance. The protuberance is delimited by a front face stop for immobilizing the rear catch in the open position and a lower face stop for immobilizing the rear catch in the locked position.

6 Claims, 5 Drawing Sheets

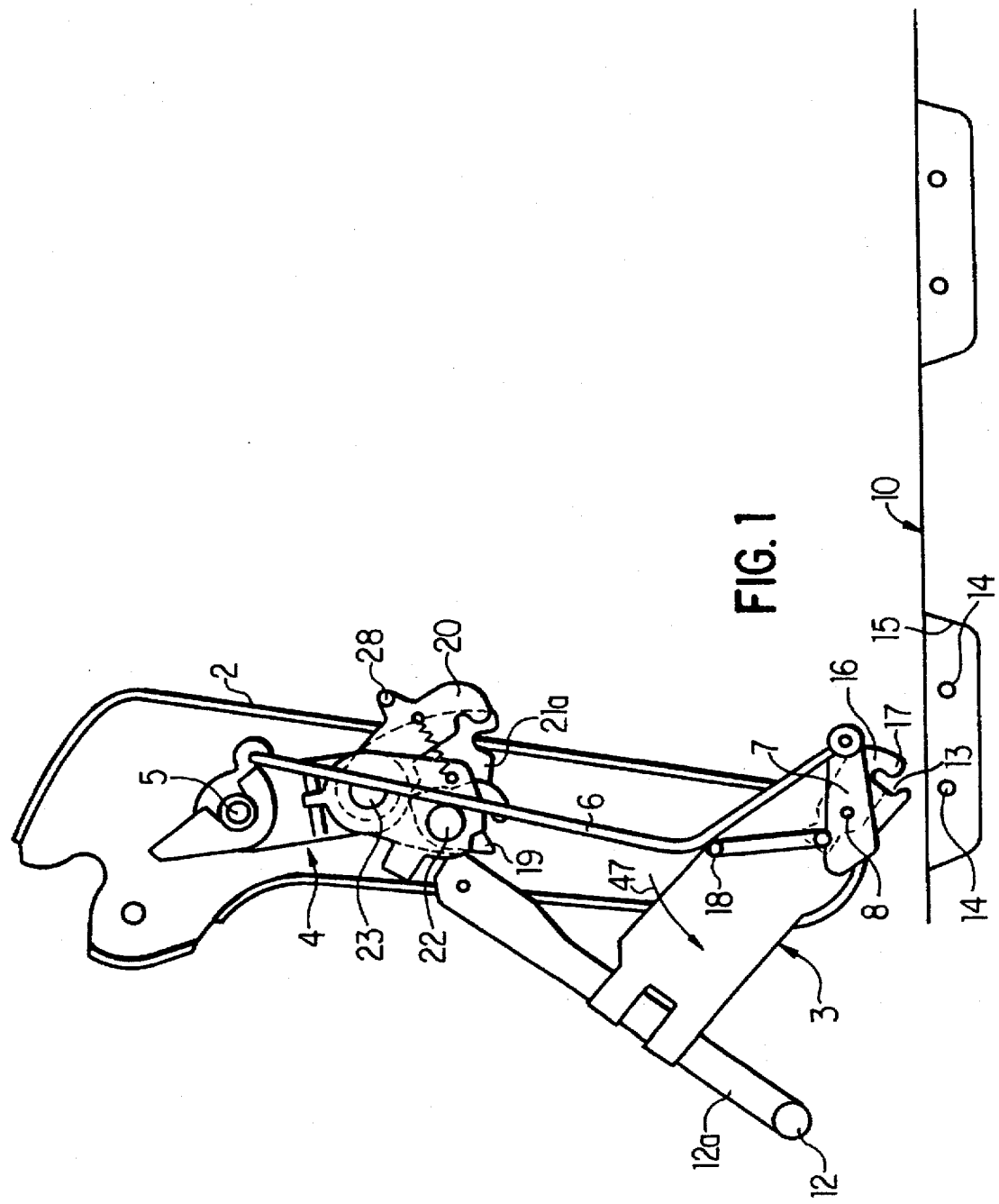

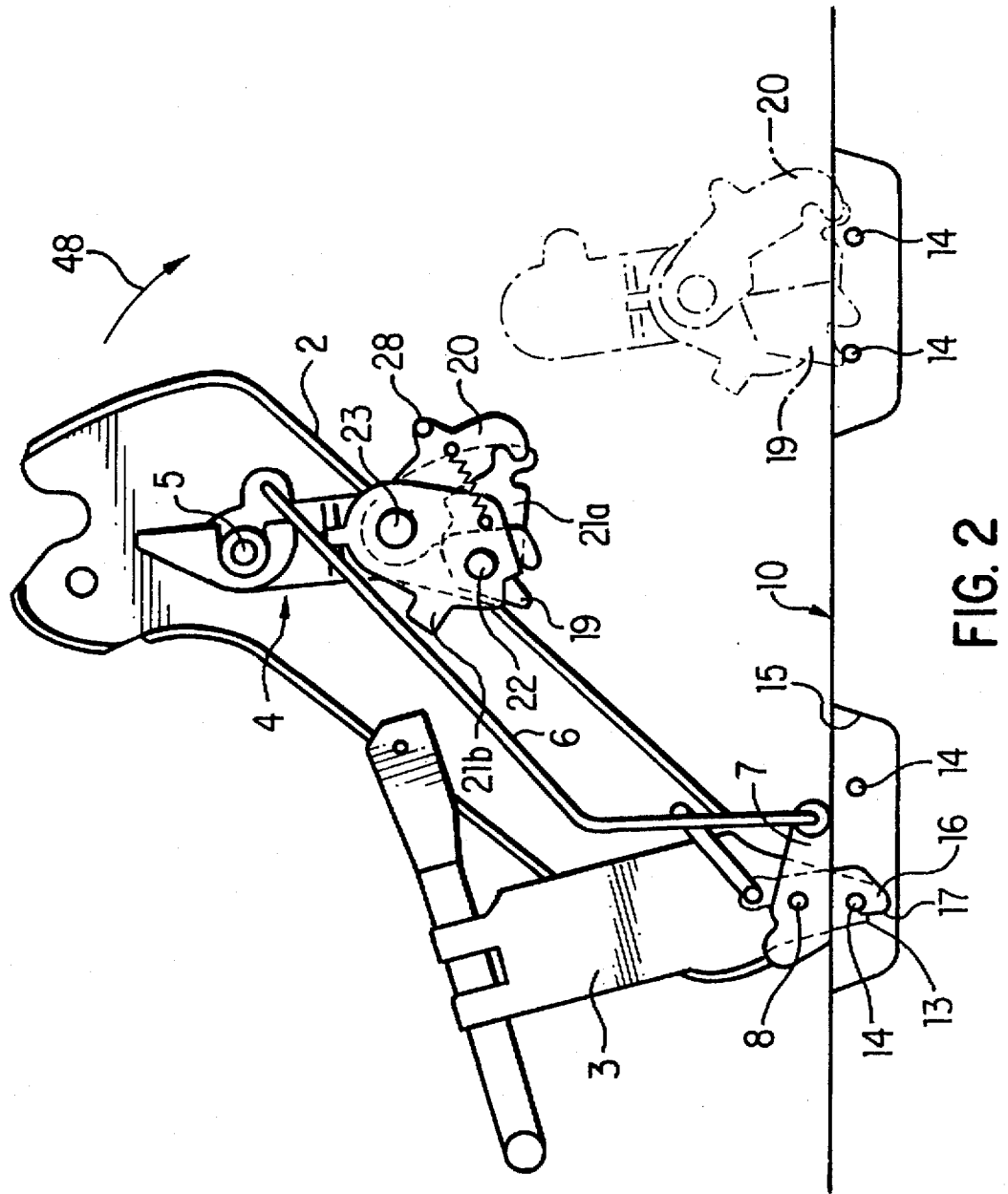

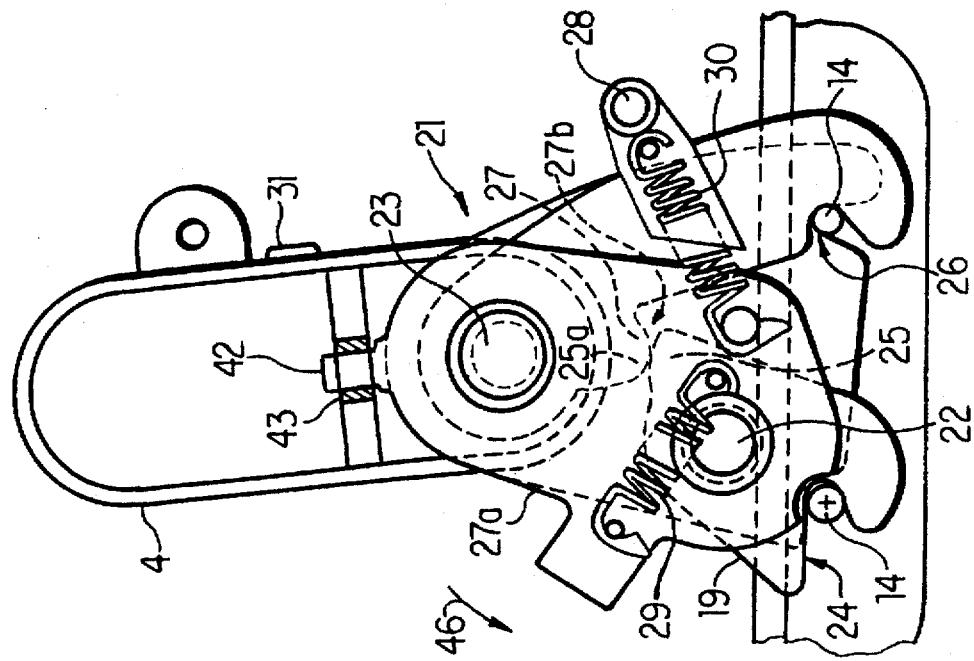
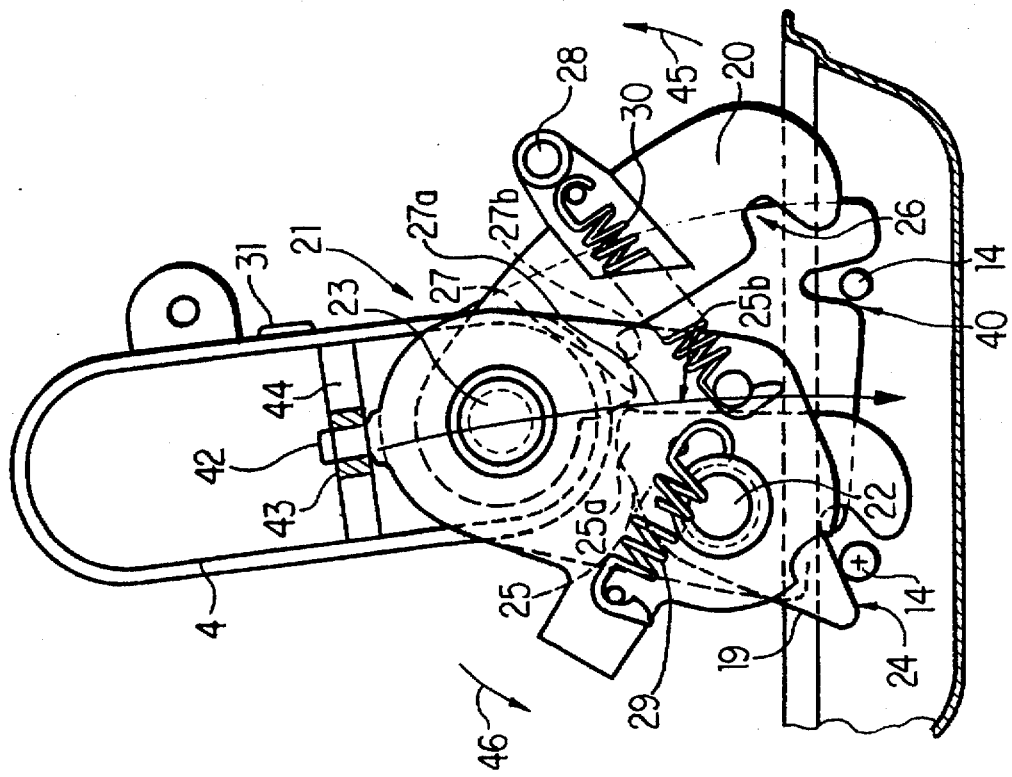

5,743,596

SAFETY FIXTURE FOR REMOVABLE SEAT OF THE VEHICLE

BACKGROUND OF THE INVENTION

The invention relates to a safety fixture for a removable vehicle seat.

The equipping of some motor vehicles with removable seats that can be taken out, without the use of any tools either in order to free-up some more floor space and increase the capacity for transporting goods, or in order to turn them around to face backward is known.

DESCRIPTION OF THE PRIOR ART

French Patent 2 556 946 describes a seat in which each of the four legs of the underframe is equipped with means for fixing to a transverse rod fixed in a well in the floor, these means comprising a fork-shaped part interacting with the transverse rod, a mobile catch for immobilizing the leg on the rod, means for returning the catch to the immobilized position and for unlocking the manual means of the catch.

Such a method of fixing is entirely satisfactory for a conventional seat but may prove insufficient when it equips a seat the chassis of which serves to fasten the three anchoring points of a seatbelt. This is because in this case, the seat-to-floor fixture must be capable of withstanding the high instantaneous forces it receives through the chassis and which result from the kinetic energy imparted to the passenger, this kinetic energy being transmitted by the straps of the belt to its three anchoring points. These forces are all the more unfavorable because in the event of a frontal impact, they tend to make the seat pivot about its front fixture, attempting to tear out the rear fixture of the seat.

SUMMARY OF THE INVENTION

The object of the present invention is to overcome these drawbacks by supplying a safety fixture providing dual locking and which locks up automatically in the event of an accident.

To this end, the means for fixing each of the rear legs comprise two hook-shaped parts which are each able to interact with one of the fixed rods arranged in a well in the floor, these two parts being formed, respectively, on a front catch and on a rear catch, while the front catch is articulated at the front and to the base of a common support and includes, opposite its hook-shaped part and in its rear upper part, a triangular heel delimited by two limit stop faces, respectively an upper one for immobilizing it in the locked position, and a rear one for immobilizing it in the open position, and the rear catch is articulated close to the top and substantially at the middle of the common support and includes, between this articulation and its hook-shaped part and on its front face, a triangular protuberance delimited by two limit stop faces, respectively a front one for immobilizing it in the open position, and a lower one for immobilizing it in the locked position.

Thanks to this structure, the means by which each of the legs of the underframe is fixed comprise two catches, the two complementary limit stops of which interact to keep these catches either in the open position, that is to say in a position in which their hooks can slip over or unhook from the anchoring rods formed in the floor, or in a locked position in which the two hooks are engaged with the rods without being able to become detached from them because of the interactions of one with the other.

As a result of the arrangement and the partnership of the stop faces, the two catches of each leg can occupy a stable open position favoring the engagement of the fixing device in the rods on the floor, and a stable and self-blocking locked position. In the event of forces on the front which tend to make the seat tip with respect to its front fixture, the front catch of the rear fixing device tends, when it is in the locked position, to pivot in the counterclockwise direction, increasing the rotational-immobilization force it exerts on the rear catch, which has the effect of preventing accidental unlocking of this catch.

Other features and advantages will become clear from the description which follows with reference to the attached diagrammatic drawing which represents, by way of example, one embodiment of this safety fixture.

DESCRIPTION OF THE DRAWINGS

FIGS. 1 and 2 are side views, in transverse section, of the lower part of a seat when it is respectively in the position for putting the front legs in place and after these have been put in place and the seat has been tilted backward in order to engage the rear legs.

FIGS. 3 and 4 show, on a enlarged scale, the rear fixing means respectively as they are being engaged on the rods in the floor and at the end of engagement.

DESCRIPTION OF THE PREFERRED EMBODIMENT(S)

Figure 5:
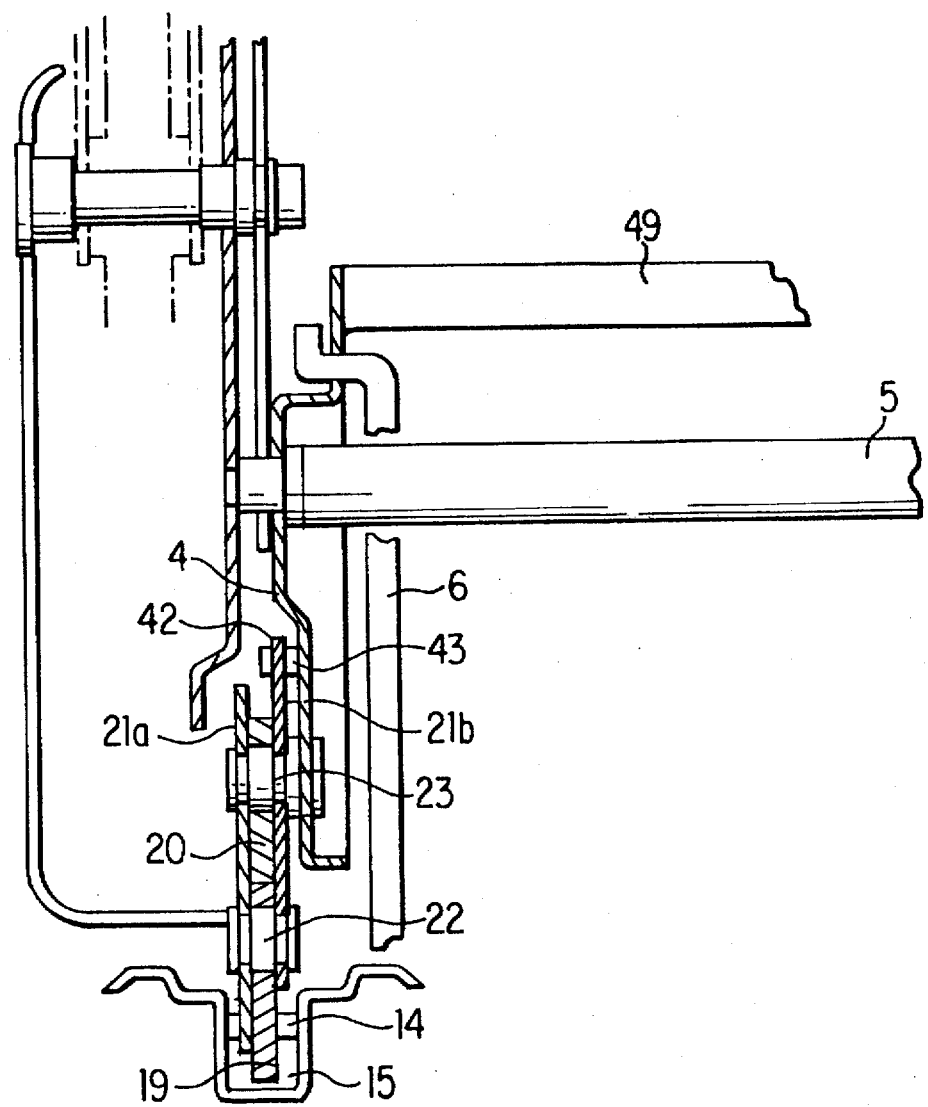
FIG. 5 is a view in section of V—V of FIG. 4.

In FIGS. 1 and 2, the numerical reference 2 denotes, in general, the chassis of the seat and more particularly the seat part armature of this seat. This armature bears two front legs 3 and two rear legs 4. The front legs are fixed rigidly to the armature 2, whereas the rear legs consist of levers 4 mounted so they can rotate freely about a shaft 5 mounted so it can pivot in the seat part armature 2. One of the levers 4 is connected, via a linkage 6, to a lever 7 articulated at 8 to the corresponding front leg 3. In the known fashion, this linkage is intended to bring the legs 4 up inside the seat part armature when the seat is pivoted forward and detached from the floor 10 of the vehicle, as shown in the position represented in FIG. 1, but also to bring the legs into the service position when the seat part armature is brought into the service position by pivoting about its front legs, as shown in FIG. 2.

Via their upper parts, the legs 3 support the sides 12a of a U-shaped frame 12 constituting the seat part support.

Each front leg is equipped with a fork 13 which is intended to slip over one of the two parallel and transverse rods 14 arranged in a well 15 in the floor Here it will be noted that to provide the fixing region of each leg with two rods 14 in order to allow the longitudinal position of a seat to be altered by selecting one or other of the two rods in a well is already known.

The means for fixing the front legs comprise, in addition to the forks 13, and for each leg, a catch 16 provided with a hook-shaped part 17. This catch is articulated about the pin 8 and is connected to return means tending to return it to the locked position. It is secured to a manual control means such as a control bar 18 connecting it to the catch of the other front leg.

According to the invention, the safety fixing device of each of the rear legs is composed of a front catch 19 and of a rear catch 20 which are mounted so they can rotate freely in a common support denoted, in general, by 21.

As shown in FIGS. 3 and 4, the front catch 19 is articulated about a pin 22 which is arranged at the front and at the base of the common support 21, whereas the catch 20 is articulated on a pin 23 which is arranged above the pin 22 close to the top of the common support and substantially at the middle of the latter. In its front lower part, the front catch 19 is provided with a fork or hook 24 and, opposite it with respect to its articulation pin 22, it is fitted with a triangular heel 25. This heel is delimited by two stop faces, namely an upper face 25a for immobilizing it in the locked position, and a rear face 25b for immobilizing it in the open position. The rear catch 20, which is articulated by one of its ends to the pin 23 is equipped, close to its other end, with a fork or hook 26. On its front face, between its articulation 23 and the fork 26, the rear lever 20 includes a triangular protuberance 27 which is delimited by two stop faces, namely a front fact 27a for immobilizing it in the open position, and a lower face 27b for immobilizing it in the locked position.

The rear catches 20 of the two rear legs are joined together by a crosspiece 28 which also constitutes a manual unlocking component.

Each of the catches 19 and 20 is associated with a return means, of the tension spring type 29, 30 as represented in the drawing, or of the spiral spring type. The return means acting on the catch 19 tends to return the latter to the open position, whereas the one 30 acting on the catch 20 tends to return the latter to the locked position and to press its protuberance 27 against the hell 25 of the catch 19.

The rear end of the spring 29 is fastened to the catch 19, whereas its front end is fastened to one of the two cheeks 21a, 21b making up the common support 21. As far as the spring 30 is concerned, it is fastened via its front end to a spacer piece 32 linking the two aforementioned cheeks and, via its rear end, to the catch 20.

Figure 6:
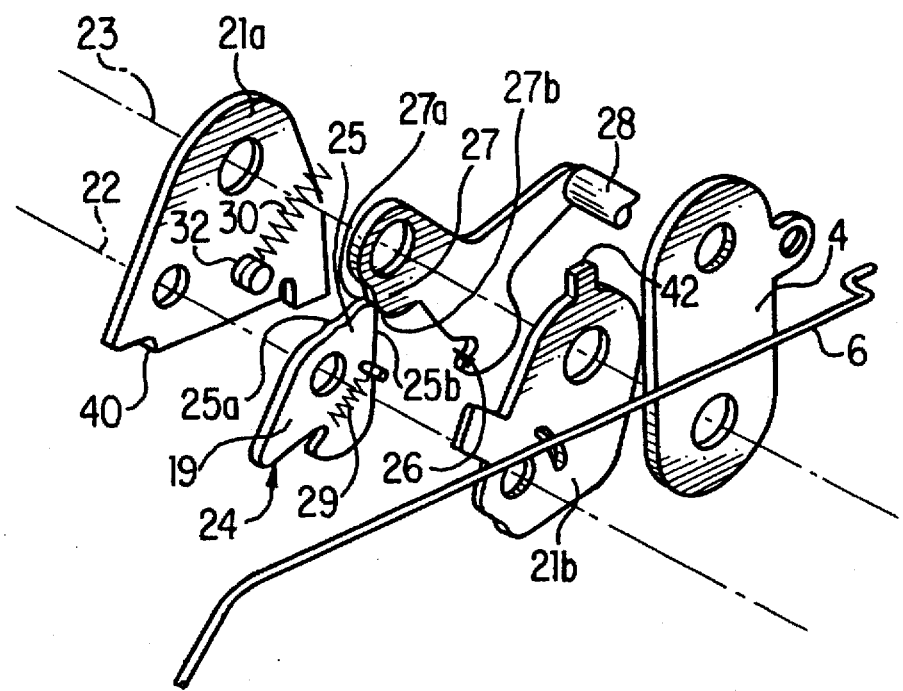
FIG. 6 is an exploded perspective view showing the essential members of the device for fixing a rear leg.

In FIG. 6, showing the constituent parts of a means for fixing a leg, it is clear that the cheek 21a of the common support 21 is provided with a positioning fork 40 emerging from its lower edge, whereas the cheek 21b is provided with a tenon 42 projecting from its upper part. As shown in greater detail in FIGS. 3 and 4, this tenon is intended to engage in a ring 43 borne by a ridge 44 of the leg 4, and the usefulness of which will be specified later. FIG. 6 also shows that each of the two cheeks 21a, 21b is mounted articulated on the pin 23 which articulates the rear catch 20 to the common support 21.

By virtue of this method of assembly, the common support 21 has a certain degree of angular mobility with respect to the leg 4, which mobility is limited by the compression of the ring 43, but which is sufficient to compensate for the dimensional variations which are due to the manufacturing tolerances on the constituent parts of the fixing device and to obtain uniform operation of this device.

In order to bring the fixing device into the open position, it is necessary to pivot the rear catch 20 in the direction of the arrow 45 of FIGS. 3. This pivoting causes its protuberance 27 to disengage from the path of the heel 25 of the front catch 19 which can thus, under the action of its return spring, pivot in the direction of the arrow 46 until its rear face butts against the spacer piece 32. After the catch 20 has been released and returned by its spring 30, the device is immobilized in its open position represented in FIGS. 1 and 2, in which position the heel 25 and possibly the rear face 25a of the catch 19 are in abutting contact with the front face 27a of the catch 20.

When the device is in the locked position and as shown in FIG. 4, the rear face 27b of the protuberance 27 of the catch 20 is in contact with the front face 25a of the heel 25 of the catch 19 and thus opposes any pivoting of this catch.

The passage from one of these positions to the other will now be described with reference to FIGS. 1 to 4.

In FIG. 1, the device for fixing the front legs is represented in the open position, corresponding to a manual action in the direction of the arrow 47 on the lever 18. That allows the hook 17 of the catch 16 to disengage the fork 13 from the corresponding leg 3 and to allow this fork to engage over the rod 14. On completion of this motion, releasing the manual action on the crosspiece 18 allows the means for returning the catch 16 to return the hook 17 around the rod 14, locking this connection as shown in FIG. 2.

In the next phase (FIG. 2), the pivoting of the seat about the front rod 14 in the direction of the arrow 48 causes, by means of the lever 7 articulated about the pin 8, the deployment of one of the legs 4 by rotating about the pin 5. This deployment, limited by a limit stop 31 on the chassis, of one of the rear legs is transmitted to the other leg by virtue of a spacer piece 49 joining these together. The pivoting brings the common support 21 articulated to each leg above the two rear rods 14 as represented in chain line in FIG. 2. On completion of the pivoting, shown in FIG. 3, and while the fork 40 of the mounting plate 21a interacts with the rear rod 14 in order to position the whole of the immobilizing device, the front rod 14 comes into contact with the hook 24 of the front catch 19 and causes this catch to pivot in the opposition direction to the arrow 46. By pivoting, the heel 25 raises the rear catch 20 in the direction of the arrow 45 until it comes free of the stop face 27a in order to come into contact, via its face 25a, with the face 27b of this rear catch. In this locked position, the two hooks 24 and 26 are fully engaged over the rods 14 and therefore doubly lock each leg to the corresponding rods 14. What is more, in the event of a frontal accident, tending to cause the seat to pivot about the front legs, lifting the rear legs up vertically, the lifting force represented by the arrow F in FIG. 4 is transmitted via the common support 21 to the pin 22 of the catch 19. This catch 19, being held on the rod 14 by its hook 24, is subjected to a torque in the direction of the arrow 46, which torque tends to press its heel 25 even harder against the protuberance 27 of the rear catch 20, thus providing a superlocking effect which automatically locks up this catch and prevents it from pivoting in the unlocking direction.

It is clear from the foregoing that the fixing device according to the invention provides not only better anchorage of the rear legs of the seat to the floor, but also increases the safety of this anchorage by preventing it from coming unlocked in the event of an accident.

I claim:

1. A safety fixture for a removable vehicle seat of the type having four legs consisting of two front legs and two rear legs, each leg being equipped with means for being affixed to at least one of two transverse rods fixed in a front or rear floor well of a vehicle, the means for affixing each front leg comprising a hook-shaped part interacting with one of the two parallel transverse rods fixed in the front floor well, a mobile catch for immobilizing each front leg on the rod, means for returning the catch, manual means for unlocking the catch, wherein the means for affixing each rear leg comprises first and second hook-shaped parts configured to simultaneously interact with a separate one of the two parallel transverse rods fixed in the rear floor well of the vehicle, the first and second hook-shaped parts being formed, respectively, on a front catch and on a rear catch, the front catch articulates at a front and toward a base of a common support and includes, a triangular heel opposite the first hook-shaped part and a rear upper part of the front catch, the triangular heel delimited by two limit stop faces, respectively and upper face for immobilizing the front catch in a locked position, and a rear face for immobilizing the front catch in an open position, the rear catch articulates proximate to a top and substantially at a middle of the common support and includes a triangular protuberance on a front face of the rear catch and between the articulation and the second hook-shaped part, the triangular protuberance being delimited by two limit stop faces, respectively a front face for immobilizing the rear catch in an open position, and a lower face for immobilizing the rear catch in a locked position.

2. The fixture as claimed in claim 1, wherein the front catch is associated with return means tending to return the front catch to the opened position, whereas the rear catch is associated with return means tending to return the rear catch to the locked position.

3. The fixture as claimed in claim 1, wherein the common support between the two catches is connected to each corresponding rear leg by an articulation with limited angular mobility.

4. The fixture as claimed in claim 3, wherein the common support is composed of two cheeks arranged on each side of the catches, and one of the cheeks is extended by a tenon penetrating a ring made of compressible material borne by the corresponding rear leg.

5. The fixture as claimed in claim 1, wherein the common support includes, emerging from a lower face of the common support, a cutout for positioning the corresponding rear leg on one of the two parallel transverse rods as the corresponding rear leg engages toward the two parallel transverse rods fixed in the rear floor well of the vehicle.

6. The fixture as claimed in claim 1, wherein the rear catches are joined together by a cross-piece forming a manual unlocking component.

* * * * *